United States Patent [19]

Adamson

[11] 4,203,090
[45] May 13, 1980

[54] TRANSPONDER SYSTEM INCLUDING AN OSCILLATOR RIPPLE COUNTER CONTROLLING A CODED ANALOG MULTIPLEX NETWORK IN A CIRCUIT WITH A DRIVER/GATE CIRCUIT FOR GENERATING RED-ALERT END CONDITION DIGITAL SIGNALS IN A STORAGE TANK GAUGING SYSTEM

[75] Inventor: John S. Adamson, Pleasant Hill, Calif.

[73] Assignee: Chevron Research Company, San Francisco, Calif.

[21] Appl. No.: 855,033

[22] Filed: Nov. 25, 1977

[51] Int. Cl.² ............... G08C 19/16; H04Q 9/14
[52] U.S. Cl. ............................. 340/152 T; 340/618
[58] Field of Search ........... 340/505, 521, 152 T, 340/618, 2, 1 L

[56] References Cited

U.S. PATENT DOCUMENTS

| 4,023,140 | 5/1977 | Siems | 340/152 T |
|---|---|---|---|
| 4,027,286 | 5/1977 | Marosko | 340/505 |
| 4,044,351 | 8/1977 | Everson | 340/505 |
| 4,067,008 | 1/1978 | Sprowls, III | 340/152 T |
| 4,072,923 | 2/1978 | Siems | 340/152 T |

Primary Examiner—Harold I. Pitts
Attorney, Agent, or Firm—R. L. Freeland, Jr.; H. D. Messner

[57] ABSTRACT

A "red-alert" end condition digital signal is generated by a transponder system of the present invention formed essentially of MSI's (Medium Scale Integrated Chips) including an oscillator/ripple counter controlling a coded analog multiplexer network in circuit with a RTL compatible gate/driver circuit. The aforementioned system both is initiated by and is in power dependent relationship with a MARK-SPACE interrogation signal and has special utility in digitally monitoring product "overflow" conditions in source/product storage tank networks associated with an oil refinery and/or a chemical complex.

17 Claims, 12 Drawing Figures

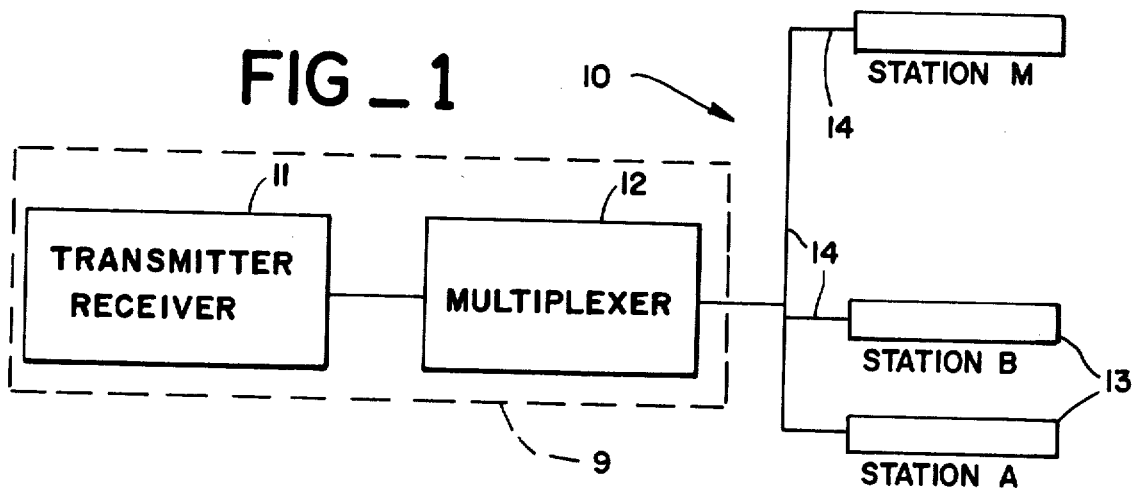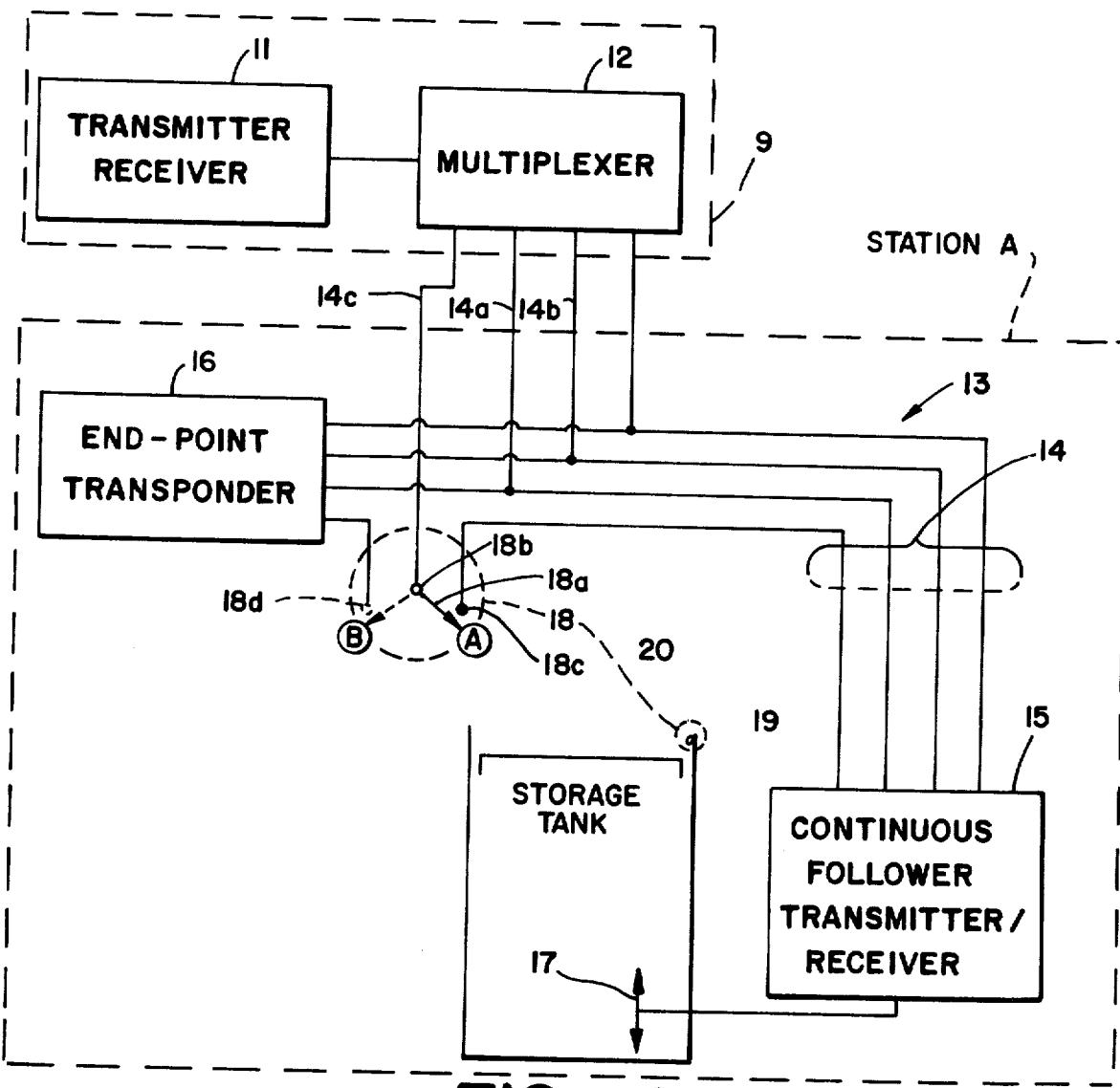

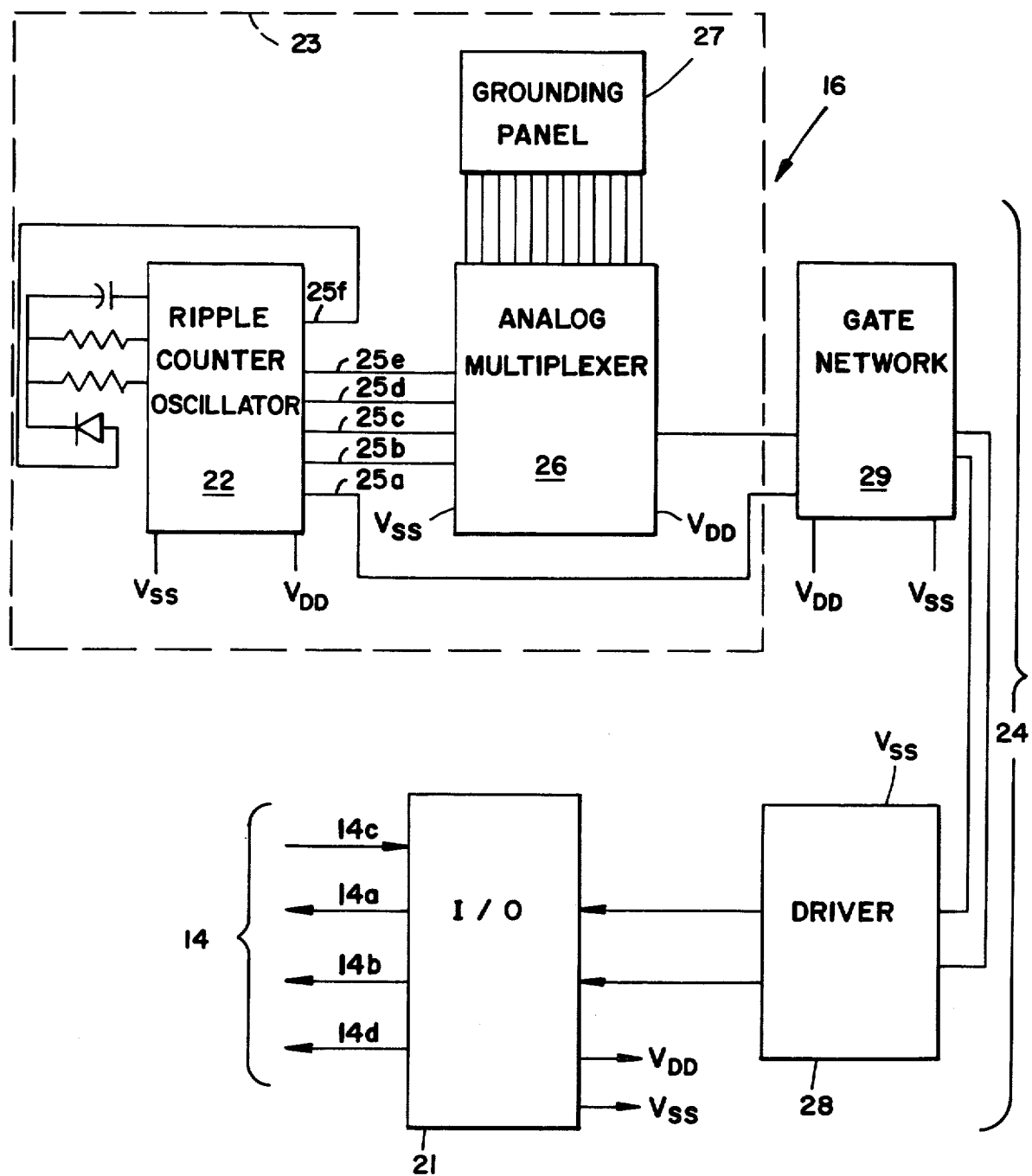
FIG_3

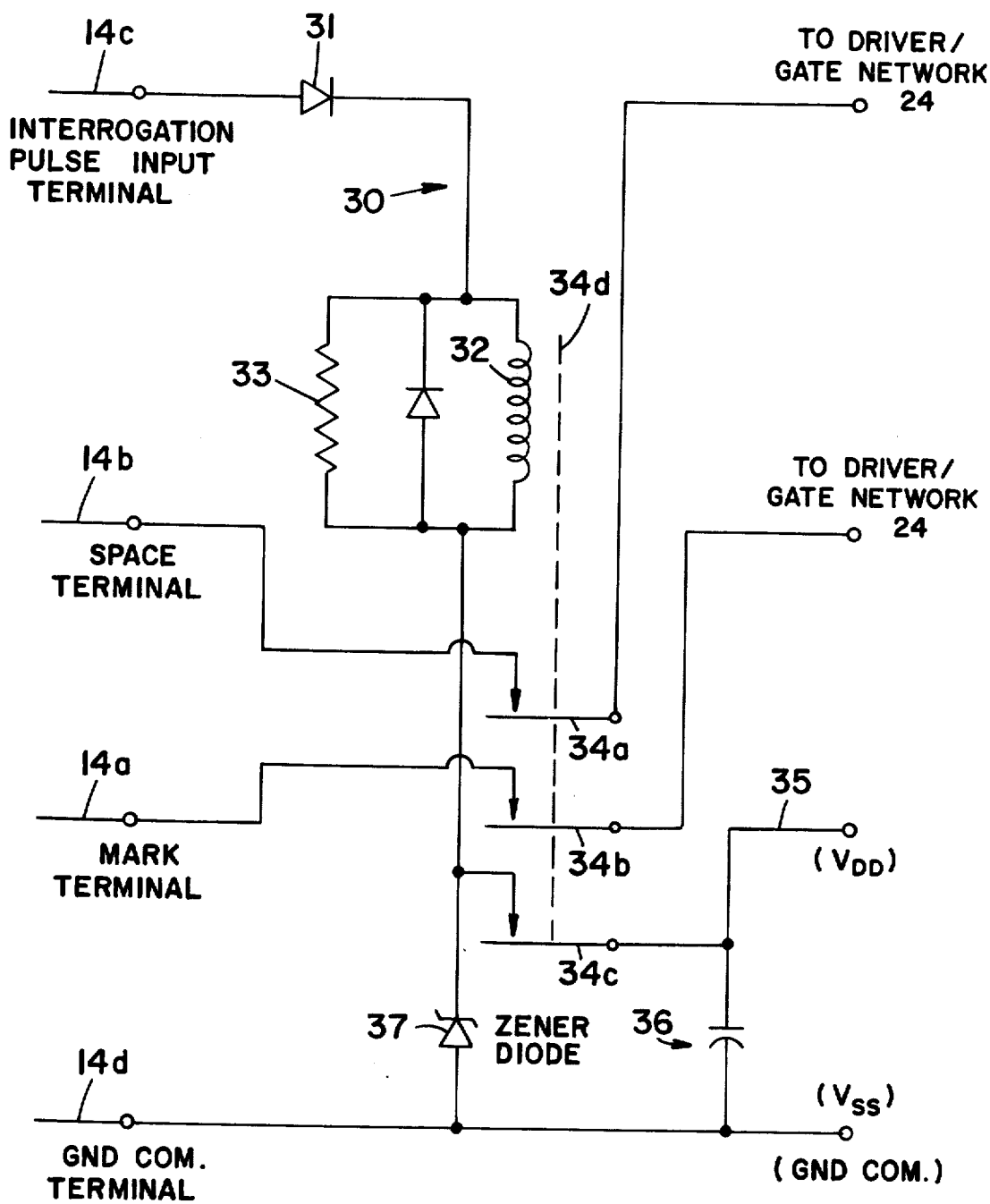
FIG_4

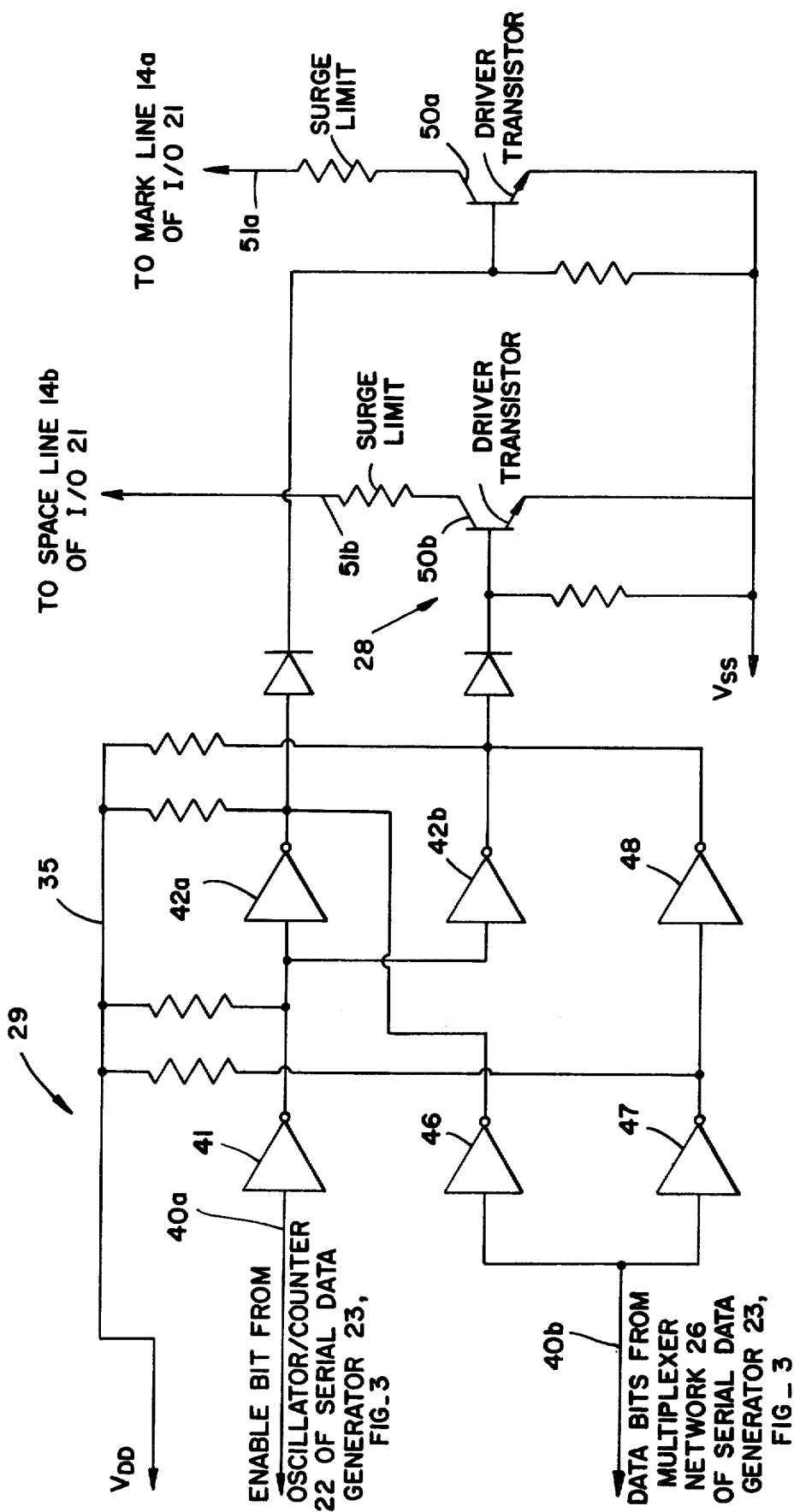
FIG_5

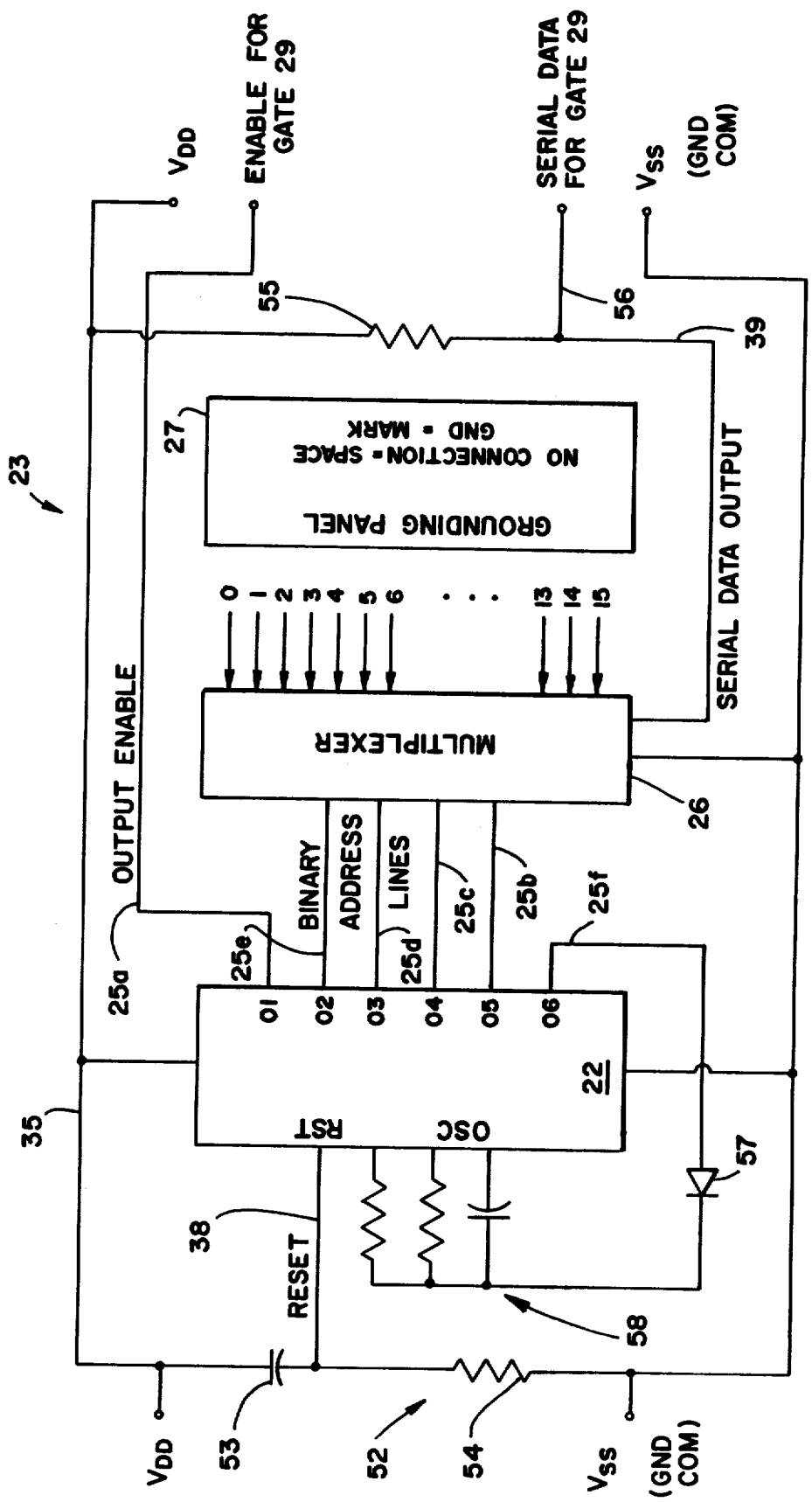
FIG_6

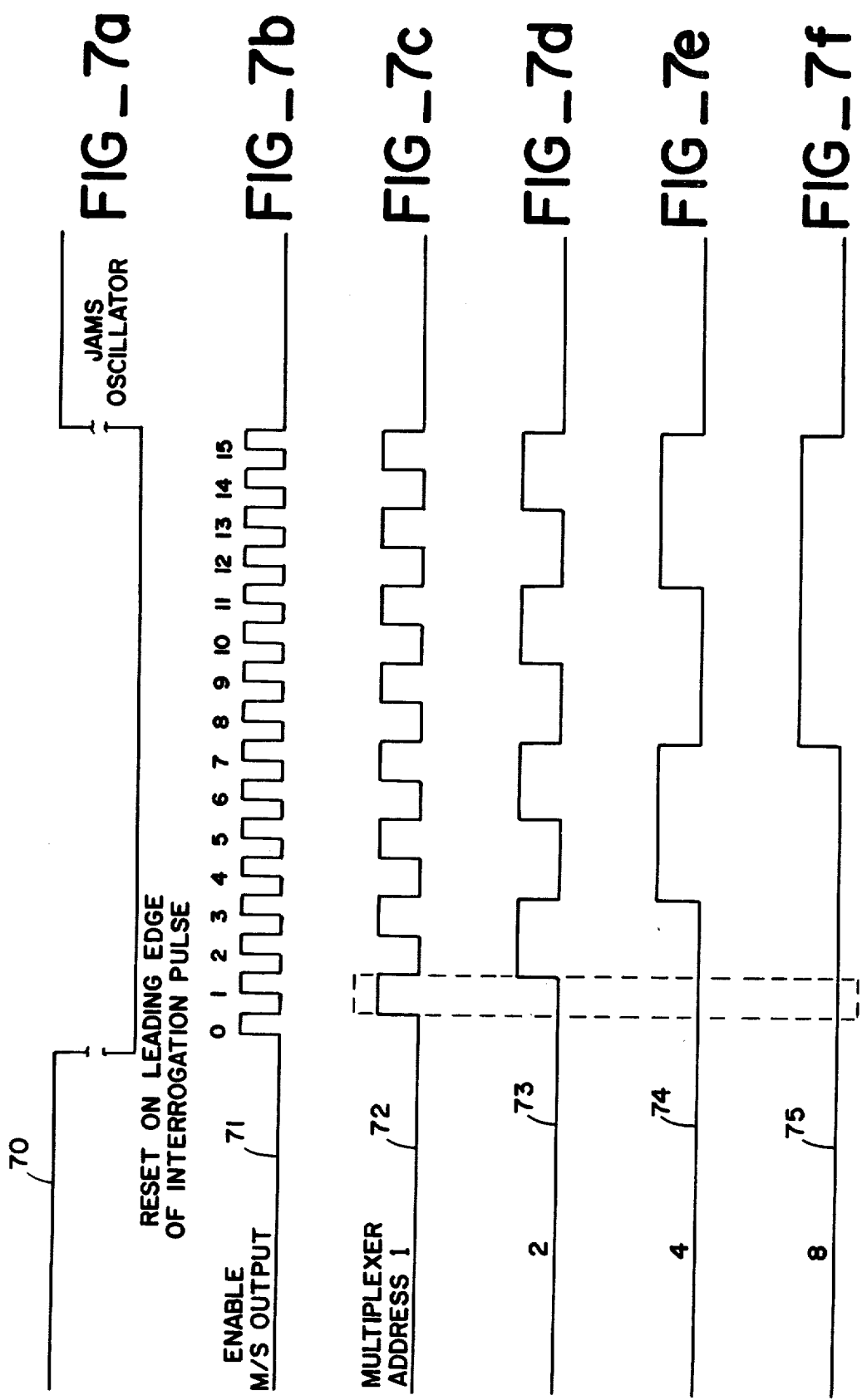

TRANSPONDER SYSTEM INCLUDING AN OSCILLATOR RIPPLE COUNTER CONTROLLING A CODED ANALOG MULTIPLEX NETWORK IN A CIRCUIT WITH A DRIVER/GATE CIRCUIT FOR GENERATING RED-ALERT END CONDITION DIGITAL SIGNALS IN A STORAGE TANK GAUGING SYSTEM

RELATED APPLICATIONS

Related applications assigned to the assignee of the instant application and incorporated herein by reference, all having a common filing date, include: U.S. Ser. No. 855,032, J.S. Adamson for "Transponder System Including An Oscillator/Ripple Counter Controlling A Fixed Gray Code Logic Network In Circuit With A Driver/Gate Circuit For Generating "Red-Alert" End Condition Digital Signals In A Storage Tank Gauging System"; U.S. Ser. No. 854,916, J. S. Adamson for "Transponder System Including An Oscillator/Ripple Counter Controlling A Fixed Gray Code Logic Network In Circuit With A Decoder/Driver Network For Generating "Red-Alert" End Condition Digital Signals In A Storage Tank Gauging System"; and U.S. Ser. No. 854,917, J. S. Adamson for "Transducer System for Continuous Monitoring Liquid Levels In Storage Tanks And The Like".

FIELD OF THE INVENTION

This invention relates to a transponder, and more particularly, to a single cycle transponder system formed essentially of MSI's (Medium Scale Integrated Chips) in which a MARK-SPACE interrogation signal of a MARK-SPACE digital tank gauging system, both initiates and powers the transponder system to provide a unique "red-alert" digital code forewarning of overflow conditions within storage vessels and the like in operative circuit therewith. The invention has particular utility in monitoring storage tank networks associated with an oil refinery and/or a chemical complex.

BACKGROUND OF THE INVENTION

In MARK-SPACE digital tank gauging systems, conductor buses directly connect all tank stations with a central control monitoring location. Individual tank stations are in multiplexed circuit connection with the central monitor. During operations, line voltage of the conductor buses must be held at a rather high level, say 48 volts, to avoid accidental tripping of the system by natural phenomenon, such as lightening. In order to create a MARK or SPACE pulse on the lines of interest, the transponder system associated therewith must pull down the MARK or SPACE line to ground potential. Experience has shown that to generate such signals by a separate transponder circuitry formed essentially of MSI's (Medium Scale Integrated Chips) where such circuits are to be formed with minimum device count, simple control capability and low power requirements is exceedingly difficult. This is especially true if the circuit must also be interfaced with present on-site tank gauging systems.

"Red-alert" (i.e., overflow) conditions in refineries and/or chemical complexes now require the use of separate end-point transponder systems. This has been brought about to a large extent, by changes in Federal and State laws. While normal refining practice seeks to avoid overloading storage tanks in any storage tank network, Federal and State laws have now increased the penalties attendant such spillage (sometimes irrespective of proximate cause) such that the aforementioned separate end-point monitoring systems are now advisable. However, experiences show that solid state end-point transponder systems are difficult to achieve because of the reasons previously mentioned.

SUMMARY OF THE INVENTION

In accordance with the present invention, a separate solid state, end-point transponder system is placed in circuit with a MARK-SPACE interrogation line of the MARK-SPACE tank gauging system through a "red-alert" condition switch in circuit with a relay coil. Assuming an end-point condition occurs within a storage tank, necessitating the generation of a "red-alert" MARK-SPACE Gray code, the condition switch first changes state. Result: the high voltage MARK-SPACE interrogation signal is shuttled through to the elements of the separate transponder system of the present invention and by-passes the usual liquid level transmitter associated with each field station. Initially, the interrogation signal is fed through a surge and polarity limiting circuit to a voltage divider network connected through a power-on-reset network to an oscillator/ripple counter controlling an analog multiplexer network in circuit with a RTL compatible gate/driver circuit. A reproduction of the "red-alert" digital code of interest is held in a "hard-wired" pattern within the analog multiplexer network and, say via selective enabling, the latter is ultimately transmitted back to the central station, for display.

In more detail, the oscillator/ripple counter is first reset wherein all output stages are set to zero, and the operation of the oscillator clock commences. As the counter ripples through a cycle, its individual output stages enable a gate network and multiplexer network inserted therewith, as follows:

(i) The least significant bit (i.e., the $2^0$ bit) enables a series of open collector transistors of the gate network such that MARK-SPACE terminals are placed in circuit with a compatible power bus.

(ii) Intermediate bits from the counter (say the $2^1$, $2^2$ ... $2^N$ bits) are fed to the analog multiplexer in sequential binary combinations ("address commands") enabling address inputs to the multiplexer, the latter having outputs connected to the gate network. Result: as a consequence of the state (HI,LOW) of the square wave ($2^0$) enable code, either a MARK or SPACE pulse is generated at the output terminals of gate/drive network through "strobed" conduction of both (i) selected transistor elements of the gate/driver network as well as (ii) heavy driver transistors within the driver network in circuit therewith. The result, a digital "red-alert" code, is fed via the MARK and SPACE lines from an input/output (I/O) network back to the central station for display. At the central station, the code can trigger an audio or visual alarm to warn of imminent overflow conditions attendant the vessel being monitored.

(iii) The most significant bit of the ripple counter (say the $2N+1$ bit) is fed via a diode back into the input thereof. As the diode conducts the clock of the counter is jammed and all output thereof are placed in inhibited state.

DESCRIPTION OF THE DRAWINGS

Further features of the invention will become more apparent upon consideration of the following detailed description of the present invention when taken in conjunction with the accompanying drawings; wherein:

FIG. 1 is a schematic of a tank gauging system servicing—from a central monitoring location—a plurality of field stations A,B . . . M;

FIG. 2 is a schematic diagram illustrating in some detail a transponder system in the present invention linked—electrically—to the tank gauging system of FIG. 1;

FIG. 3 is yet another schematic diagram illustrating in still more detail the transponder system of FIG. 2; and FIGS. 4, 5 and 6 are circuit diagrams of selected circuit elements of the transponder system of FIG. 3; and FIGS. 7a-7f are timing charts of sets of square wave pulses generated by the circuit of FIG. 3.

SPECIFIC EMBODIMENTS OF THE INVENTION

Reference should now be had to FIG. 1 illustrating a digital tank gauging system 10 modified in accordance with the present invention.

As shown, system 10 includes a transmitter-receiver 11 and multiplexer 12 located at a central station 9. Receiver-transmitter 11 and multiplexer 12 are in circuit with each other and, in addition with a plurality of field transmitter-receiver networks 13. The latter are located at, i.e., positioned within, a series of tank monitoring stations, A,B . . . M and connect to the former through a series of MARK-SPACE conductor buses 14.

Each field transmitter-receiver network 13 at each of the different monitoring station A,B . . . M, is individually interrogated in sequence by the receiver-transmitter 11 and multiplexer 12 operating at the central station 9. In more detail, the transmitter-receiver 11 and multiplexer 12 interrogate each individual station A,B . . . M through the emission of a predetermined MARK-SPACE interrogation signal. The last-mentioned signal is usually designed to have a high relative amplitude, say 48 volts d.c., to avoid accidental tripping of the system. It is also uniquely codable vis-a-vis station A,B . . . or M. In response to such signal, a MARK or SPACE pulse, in turn, is generated by the appropriate network 13. Its duration and polarity may differ, however, from that of the interrogation signal in that it must be generated by pulling down the MARK or SPACE line to ground potential. And, its pulse width, while common to other MARK or SPACE pulses, is much smaller than that of interrogation pulse. But to generate such signals using MSI's (Medium Scale Integrated Chips) within each network 13 has been found to be exceedingly difficult in practice to accomplish.

FIG. 2 shows a field transmitter-receiver network 13 in more detail.

As shown, network 13 includes a continuous follower transmitter-receiver (TR) 15 in circuit with an endpoint transponder system 16 in the present invention. All control and data signals enter and leave TR circuit 15 and transponder system 16 via elements of the conductor buses 14 previously mentioned to separately control and interact with condition sensors 17 and 18.

Note that the TR circuit 15 and transponder system 16 separately but alternately utilize the sensors 17 and 18. There are similarities, however between them, such as the sensors 17 and 18 both being located within storage tank 19.

In operation, sensor 17 provides a drive signal to the transmitter-receiver circuit 15 proportional to liquid level, such sensor 17 being a float and rotary digital position encoder or the like, well known in the art; while sensor 18 can be an end-point condition switch having two positions: an inactive or passive position A in which arm 18a contacts terminals 18b and 18c, and an enable or active position B in which arm 18a links terminals 18b and 18d as shown in phantom line.

In position A, TR circuit 15 is placed in electrical linkage with multiplexer 12 whenever the corrected addressed interrogation signal is generated therefrom. It is fed thereto via interrogation line 14c. Note that line 14c can also be linked to the end-point transponder 16 depending on the "state" of the condition switch 18. In either "position", switch 18 does not, however, effect data being fed via MARK line 14a or SPACE line 14b, vis-a-vis, central station 9.

Position B occurs when "red-alert" (i.e., overflow) conditions are imminent, end-point condition switch arm 18a being tripped, through appropriate mechanical rotation as, say as a functional movement of floating roof 20 of tank 19. I.e., as roof 20 reaches a predetermined position, the condition switch arm 18a can be mechanically rotated from position A to position B. Result: the end-point transponder system 16 of the present invention is placed in circuit with multiplexer 12 at the central station 9.

FIG. 3 illustrates the transponder system 16 of the present invention in more detail.

As shown, I/O network 21 initiates operations whenever the correctly addressed interrogation signal (via interrogation line 14c) is received from the central station 9. Within the I/O 21 is a voltage divider (to be later described in more detail) which aids in generating a power-on-reset pulse for an oscillator/ripple counter 22 of a seriel data generator 23 as well as drive voltage for the former and latter as well as for resistor-transistor logic (RTL) gate/driver network 24 in circuit with the serial data generator 23.

Briefly, in operation, the interrogation voltage pulse is divided and a leading edge of the divided pulse is used as follows: in a power-on-reset network at the input of the oscillator/ripple counter 22 of the serial data generator 23: it first resets all output stages 25b-25e to zero and then starts the oscillator clock to initiate system operations. As a result, a series of sequential binary "address" commands are generated which enable, in sequence, a series of inputs to analog multiplexer 26. The multiplexer 26 is connected to a grounding panel 27 for the purpose of generating through selective connection, a reproduction—at microcircuit input levels—of the "red-alert" code of interest. In this regard, the synthetic MARK pulses are created if the particular address of the multiplexer 26 is at ground potential and a synthetic SPACE pulse is created if the address is open circuited. But the resulting code of interest created at gate/driver network 24, is at microcircuit voltage and current levels, as previously mentioned, and must be increased to a level which is incompatible with conventional tank gauging systems. To generate a compatible code, the gate/driver network 24 includes a driver network 28 in circuit with a gate network 29. As the gate network 29 gates the synthetic Gray code through to the driver network 28, each microcircuit pulse controls a switching transistor within the network 28, having an output connected to the MARK or SPACE levels of the conventional tank gauging system. Result: the "red-alert" code of interest can be transmitted back to the central station for display and analysis as a function of the synthetic code generated by the serial generator 23 though I/O 21.

FIG. 4 illustrates I/O 21 in more detail.

I/O 21 includes a surge and polarity limiting circuit 30 at its input. The circuit 30 comprises a reverse polarity protection diode 31. A relay coil 32 is in circuit with the diode 31 through surge limiting resistor 33. In operation, the doide 31 only conducts when an interrogation signal of the correct polarity as applied to the I/O 21. Note that the interrogation signal not only energizes the relay coil 32 (closing relay contacts 34a-34c through linkage 34d) but it also powers the remainder of the system via power bus 35 and voltage divider 36. The voltage divider 36 is common in the art and reduces the voltage of the interrogation pulse via resistor 33 and Zener diode 37 to a level compatible with microcircuit logic, e.g., say at about 12 volts in the instant application. With the closing of relay contacts 34b and 34c, note the driver/gate network 24 of FIG. 3 is placed in circuit with output data MARK and SPACE bus lines 14a and 14b.

FIG. 5 illustrates gate/driver network 24 in more detail.

As shown, the gate/driver 24 includes gate circuit 29 connected to driver network 28 at the output of the former. As shown, gate circuit 29 includes inputs 40a and 40b which are in circuit with oscillator/ripple counter 22 and multiplexer 26, respectively, of serial data generator 23 of FIG. 3.

As properly coincident, HI's appear at inputs 40a, 40b, the gate circuit 29 is selectively enabled allowing switching transistor 50a and 50b of the driver network 28 to conduct. Result: the MARK or SPACE line at the output 51a or 51b of these transistors is pulled down—momentarily—to ground potential, generating the "red-alert" Gray code of interest.

Operation of the transistors 50a or 50b is controlled by conduction (or non-conduction) or paired Darlington open collector transistors (41, 42a, 42b, 46, 47 and 48 and various resistors comprising the gate network 29, well known in the art.

In this regard, note that the synthetic microcircuit logic code generated by the serial data generator 23 controls the base of each transistors 50a or 50b in relation to power bus 35. In such operation, such code functions as a switching signal of these transistors. How such synthetic code can be generated dictates the success, to some degree, of the present invention, and hence operation of serial data generator 23 in this regard is of some importance.

FIG. 6 illustrates serial bit generator 23 in detail.

As shown, the generator 23 includes at input 38, a power-on-reset network 52. The network 52 includes a capacitor 53 in circuit with resistor 54 whereby the leading edge of the dc input (dc) generates a power-on-clear pulse for the oscillator/counter 22. p Not only are all output stages 25b-25e of the counter 23 set to zero by such pulse, but also the latter initiates operation of the oscillator clock. As the counter 26 ripples through a single cycle, individual output stages 25a-25e are activated to controllably enable analog multiplexer network 26 as well as resistor-transistor-logic (RTL) gate/driver network 24 as explained above.

E.g., the least significant bit, say the $2^0$ bit of the oscillator/counter 22, can be utilized to enable gate network 29 via control bus 25a; note that the gate network 29 as previously discussed, can include a series of Darlington paired open collector transistors as previously indicated for operation of a pair of switching transistors 50a, 50b of drive network 28 of FIG. 5 in circuit with the MARK and SPACE lines 14a, 14b. When the gate network 29 is enabled by the $2^0$ bit, serial data bits can be controllably generated at the output 39 of the multiplexer 26 via momentary connection of grounded "addresses" of panel 27 to power bus 35 through pull up resistor 55. The serial bits pass to gate network 29 via output conductor 56.

These data bits, i.e., say the $2^1$, $2^2$, $2^3$ ... $2^n$ bits of counter 22 feed the analog multiplexer 26 via data buses 25b-25e, such bits being in a sequential combination to enable different consecutive inputs preprogrammed via the grounding panel 27 in circuit with the multiplexer 26, as previously described. Result: as a consequence of conductor state (HI or LOW) as dictated by the positioning of grounding conductors of panel 27, either a synthetic MARK or a SPACE microcircuit pulse is generated at output 56 of the multiplexer 26. These pulses, in turn, are generated via driver/gate network 24, as explained in detail above, to levels compatible with conventional tank gauging systems. The resulting digital "red-alert" code on MARK-SPACE bus line 14a,14b is displayed at the central station. Such code can trigger an audio or visual alarm at the central station to warn of imminence of overflow conditions of interest.

The most significant bit of the oscillator/counter 22, say the $2^{N+1}$ bit is last fed via bus 25f back to the diode 57 at the input to the counter 22 (i.e., to RC circuit 58). In operation, conduction of the diode 57 "jams" the oscillator clock of the latter. All output stages of the counter are then placed in an inhibited state. All operations cease.

The synthetic Gray code generation can be futher explained with reference to the timing chart of FIGS. 7a-7f.

As shown, the pulse width of interrogation signal 70 of FIG. 7a is such that usually a certain total of MARK and SPACE pulses, say sixteen, can be provided per interrogation cycle. Hence, the number and pulse width of the enable ($2^0$) pulses of the pulse code 71 of FIG. 7b for gate network 29 would correspond in kind to the MARK and SPACE pulses ultimately generated and displayed. I.e., the square wave enabling code 71 would have a repetition rate and pulse width matchable in kind to the MARK and SPACE pulses generated by the driver network 28 back to the I/O 21 of FIG. 3. This is not true for the address command codes 72, 73, 74 and 75, of FIGS. 7c-7f. Each is initiated by the falling edge of the initial pulse of the preceeding set of square wave address pulses and has a progressively increasing pulse width and correspondingly progressively decreasing repetition rate. Note all codes 71-75 as well as the disabling bit terminate coincident with the trailing edge of the interrogation pulse 70 of FIG. 7a.

Cyclic operations using the above-described codes of the oscillator/ripple counter 22 in connection with multiplexer 26 of serial data generator 23 and logic gate/drive network 24 are set forth in Table I below.

TABLE I

| Disable $2^{N+1}$ Bit | Data $2^N \ldots 2^2, 2^1$ Bits | Enable $2^0$ Bit | Comment |
|---|---|---|---|
| 0 | 0000 | 0 | Resets counter; clock starts |

TABLE I-continued

| Disable $2^{N+1}$ Bit | Data $2^N \ldots 2^2, 2^1$ Bits | Enable $2^{0}$ Bit | Comment |
|---|---|---|---|
| 0 | 0000 | 1 | Outputs Address 0 |
| 0 | 0001 | 0 | Sets multiplexer to output Address 1 |
| 0 | 0001 | 1 | Outputs Address 1 |
| 0 | 0010 | 0 | Sets multiplexer to Address 2 |
| 0 | 0010 | 1 | Outputs Address 2 |
| 0 | 0011 | 0 | Sets multiplexer to Address 3 |
| 0 | 0011 | 1 | Outputs Address 3 |
| 0 | 0100 | 0 | Sets multiplexer to Address 4 |
| 0 | 0100 | 1 | Outputs Address 4 |
| 0 | 0101 | 0 | Sets Address 5 |
| 0 | 0101 | 1 | Outputs Address 5 |
| 0 | 0110 | 0 | Sets Address 6 |
| 0 | 0110 | 1 | Outputs Address 6 |
| 0 | 0111 | 0 | Sets Address 7 |
| 0 | 0111 | 1 | Outputs Address 7 |
| 0 | 1000 | 0 | Sets Address 8 |
| 0 | 1000 | 1 | Outputs Address 8 |
| 0 | 1001 | 0 | Sets Address 9 |
| 0 | 1001 | 1 | Outputs Address 9 |
| 0 | 1010 | 0 | Sets Address 10 |
| 0 | 1010 | 1 | Outputs Address 10 |
| 0 | 1011 | 0 | Sets Address 11 |
| 0 | 1011 | 1 | Outputs Address 11 |
| 0 | 1100 | 0 | Sets Address 12 |
| 0 | 1100 | 1 | Outputs Address 12 |
| 0 | 1101 | 0 | Sets Address 13 |
| 0 | 1101 | 1 | Outputs Address 13 |
| 0 | 1110 | 0 | Sets Address 14 |
| 0 | 1110 | 1 | Outputs Address 14 |
| 0 | 1111 | 0 | Sets Address 15 |
| 0 | 1111 | 1 | Outputs Address 15 |
| 1 | 0000 | 0 | JAMS clock of counter |

From the above, it is apparent that the invention as hereinbefore described has variations readily apparent to those skilled in the art and hence the invention is not limited to the combination of embodiments hereinbefore described but should be given the broadest possible interpretation in the terms of the following claims.

What is claimed is:

1. Transponder network for generating a "red-alert" digital code upon (i) occurrence of an overflow condition within a storage tank under survey and (ii) receipt of a square wave interrogation signal from a transmitter/receiver of a tank gauging systems located at a central station remote from said storage tank but electrically connected to said transponder network through an INTERROGATION, a MARK and a SPACE line of said tank gauging system, comprising:

(A) I/O network for receiving said interrogation signal including voltage divider means for generating a microcircuit drive voltage for a period concident with the pulse width of said interrogation signal;

(B) an oscillator/ripple counter formed essentially of MSI's connected to said I/O network and including at an input, a power-on-reset network for generating a reset pulse for said oscillator/ripple counter, said oscillator/ripple counter generating, in response to said reset pulse, sets of square wave pulses of differing repetition rates and pulse widths;

(C) multiplexer means and gate means connected to each other and to (B) responding to selected sets of said square wave pulses to generate a synthetic digital code at microcircuit signal levels at an output means of said gate means;

(D) drive means including switching transistor means having one or more inputs connected to said gate means of (C), and one or more output means connected to said MARK and SPACE lines through said I/O of (A), said drive means being controllable as a function of said synthetic digital code to drive said MARK and SPACE lines between tank gauging operating potentials for generating said "red-alert" digital code of interest at said central station whereby said overflow condition within said storage tank can be indicated.

2. Transponder network of claim 1 in which each subsequent set of said sets of generated square wave of pulses of (B) excluding an initially first generated set of square wave pulses, has a progressively increasing pulse width and a decreasing repetition rate as compared to such succeeding set of pulses.

3. Transponder network of claim 2 in which said each subsequently generated set of square wave pulses is initialed in coincident with a trailing edge of an initially generated pulse of said succeeding set of pulses, but all sets terminate in coincidence with termination of said interrogation signal.

4. The transponder network of claim 2 in which said initial first generated set of square wave pulses by (B) is characterized by a repetition rate higher than those of said subsequent sets of square wave pulses, for enabling said gate means of (C) at said same repetition rate, and generating said synthetic digital code at microcircuit signal levels at said output means of said gate means.

5. The transponder network of claim 4 in which each subsequent set of generated sets of square wave pulses provide in combination a series of multi-bit address commands for said multiplexer of (C) whereby an output line thereof is placed in alternately circuit with a power bus through a pull-up resistor, to receive said synthetic code of interest, said pull-up resistor also being in series with said gate means.

6. Transponder network of claim 1 in which (A) includes a polarity protection network in circuit with said INTERROGATION line of said tank gauging system.

7. Transponder network of claim 1 in which (D) includes a surge limiting network in circuit with said MARK and SPACE lines of said tank gauging system through (A).

8. Method for generating a "red-alert" digital code upon (i) occurrence of an overflow condition within a storage tank under survey and (ii) receipt of a square wave interrogation signal from a transistor/receiver of a tank gauging system located at a central station remote from said storage tank but electrically connected to said transponder network through an INTERROGATION, a MARK and a SPACE line of said tank gauging system, comprising the steps of:

(A) from said interrogation signal, generating a microcircuit drive voltage for a period coincident with the pulse width of said interrogation signal;

(B) generating sets of square wave pulses of differing repetition rates and pulse widths;

(C) in response to selected sets of said square wave pulses of (B) forming a digital, multiplexable address code, generating a synthetic digital code at microcircuit signal levels;

(D) as a function of said synthetic digital code driving said MARK and SPACE lines for generating said "red-alert" digital code of interest and said central station whereby said overflow condition within said storage tank can be indicated.

9. Method of claim 8 in which each subsequent set of said sets of generated square wave pulses of (B) excluding an initially first generated set of square wave pulses, has a progressively increasing pulse width and a decreasing repetition rate as compared to each succeeding set of pulses.

10. Method of claim 9 in which said each subsequent generated set of square waves pulses of (B) is initiated in coincidence with a trailing edge of an initially generated pulse of said succeeding set of pulses, but all sets terminate in coincidence with termination of said interrogation signal.

11. Method of claim 9 in which said initial first generated set of square wave pulses of (B) is characterized by a repetition rate higher than those of said subsequent sets of square wave pulses, for generating an enabing code, whereby said synthetic digital code at microcircuit signal levels can be gated to drive said MARK and SPACE linves of (D) at said same repetition rate.

12. The transponder system of claim 11 in which each subsequent set of generated set of square wave pulses provide in combination a series of multi-bit address commands of (C) whereby an output line is placed in alternately circuit with a power bus through a pull-up resistor, to receive said synthetic code of interest, said pull-up resistor also being in series with said power bus.

13. Method of claim 8 in which (A) includes protecting solid state elements in circuit with said INTERROGATION line of said tank gauging system from signals of wrong polarity.

14. Method of claim 8 in which (D) includes limiting signal surges through solid state elements in circuit with said MARK and SPACE lines of said tank gauging system.

15. Method of claim 12 in which each of said sets of multibit addresses is designated address 1, address 2, address 3 . . . address N.

16. Method of claim 15 with the additional sub-step of (B) being generating of N+1 address pulse terminating all operations.

17. Method of claim 8 in which said MARK line address code is a fixed 1-in-16 enabling code and in which said SPACE line address code is a fixed 15-in-16 enabling code.

* * * * *